April 7, 1936.  W. SCHNEIDER  2,036,546

FILTER LAYER

Filed Feb. 24, 1933

Fig. 1.

2 Emulsion
1 Support

Filter layer comprising a binding agent 3 and a dye decolorizable in the developing solution having the formula — $R_1 = CH-R_2$ — wherein $R_1$ is a cyclic compound containing a keto group in beta position to the CH group and $R_2$ is an aromatic radical.

Fig. 2.

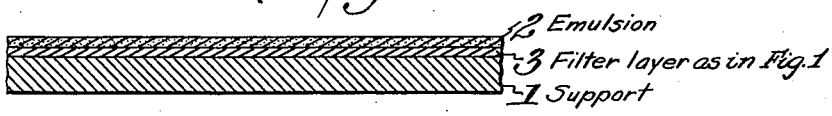

2 Emulsion
3 Filter layer as in Fig. 1
1 Support

Fig. 3.

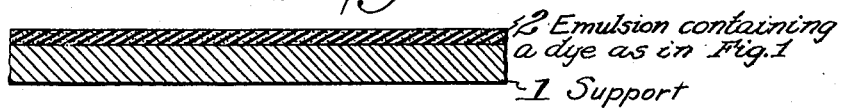

2 Emulsion containing a dye as in Fig. 1
1 Support

Inventor:
Wilhelm Schneider,
By Philip S. Hopkins,
Attorney.

Patented Apr. 7, 1936

2,036,546

UNITED STATES PATENT OFFICE 2,036,546

FILTER LAYER

Wilhelm Schneider, Dessau in Anhalt, Germany, assignor to Agfa Ansco Corporation, Binghamton, N. Y., a corporation of New York Application February 24, 1933, Serial No. 658,452
In Germany February 27, 1932

5 Claims. (Cl. 95—31)

My present invention relates to photographic materials and more particularly to filter layers or anti-halation layers to be used in combination with photographic materials such as plates or films.

One of its objects is an improved filter layer or anti-halation layer the coloration of which can be completely and permanently decolorized within a short time in photographic developing solutions. Further objects will be apparent from the detailed specification following hereafter.

My new filter layers consist of a colloid layer having incorporated in it a dye which is obtainable by condensing molecular proportions of an aromatic or cyclic aldehyde with a cyclic compound containing a methylene group capable of reaction. Suitable aldehydes are, for instance, benzaldehyde, hydroxybenzaldehydes, mono- and di-alkoxybenzaldehydes, furfural, naphthaldehydes, hydroxynaphthaldehydes and the substitution products of these several aldehydes. As substituents enter into consideration all atoms or radicals used as substituents in the manufacture of dyestuffs, such as auxochrome, bathochrome, hypsochrome groups, or groups which influence the solubility or the capacity to crystallize of known dyestuffs. As cyclic compounds containing a methylene group capable of reaction there may for instance, be enumerated malonyl urea, malonyl thiourea, oxythionaphthenes, oxyselenonaphthenes, coumaranon, keto-hydrindenes, di-keta-hydrindenes, or the like. The condensation between the compounds takes place in such a manner that the methylene group reacts with the aldehyde group under separation of water.

The filter and anti-halation layers can be used in the form of intermediate layers or backings. It is, however, also possible to dye the emulsion layer which thus becomes a filter layer.

In the accompanying drawing Fig. 1 represents an embodiment of the invention in which the filter layer is in the form of a backing;

Fig. 2 represents an embodiment in which the filter layer is interposed between the emulsion and the support; and Fig. 3 represents an embodiment in which the filter or anti-halation substance is contained in the emulsion layer.

In Figs. 1 and 2, 1 is the support, 2 the emulsion layer and 3 the filter or anti-halation layer. In Fig. 3, 1 is the support, 2 is the emulsion layer containing filter or anti-halation substance.

The group of compounds above mentioned also comprises such substances in which by a tautomeric rearrangement a methylene group capable of reaction is formed, for instance, in the following grouping of atoms:

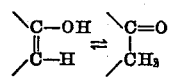

The dyestuffs according to this invention may also be used to cover an absorption gap in a filter layer or an anti-halation layer if desired in combination with other dyestuffs.

Furthermore the filter layer may be coated with lacquers of dairylmethane derivatives in order to protect them against the influence of humidity. The dyestuffs may be incorporated in the lacquer and to prevent the dyestuffs, during storage, from diffusing into the support, it is advantageous to interpose between the filter layer and the support an intermediate layer which is soluble or capable of swelling in water. Suitable substances for the intermediate layer are, for instance, gum arabic, ammonium polyglucuronate and gelatin.

The following examples illustrate the invention:

Example 1.—12.8 grams of malonyl urea and 22.0 grams of 4-dimethylamidobenzaldehyde-2-sulfonic acid are dissolved in hot water and heated to boiling temperature. The reaction mixture yields a condensation product crystallizing out in laminae having colors ranging from red to green. The reaction may be supposed to be as follows:

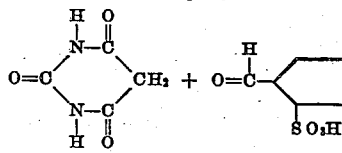 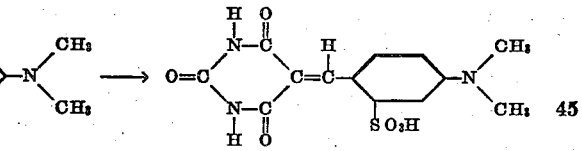

2 to 10 grams of this dyestuff are introduced into a solution of 10 grams of ammonium polyglucuronate in 1000 cc. of water. Then the solution is applied in the usual manner to the rear side of a photographic film.

Example 2.—25 grams of sodium-o-benzaldehydesulfonate and 15 grams of oxythionaphthene are dissolved in 150 cc. of alcohol and the solution is heated to boiling temperature. On addition of about 2 cc. of piperidine a yellow dyestuff of the following probable constitution:

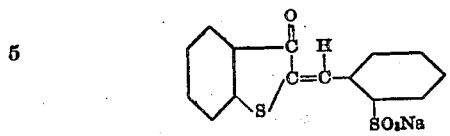

is precipitated. 4–8 grams of this dyestuff is added to a solution of 100 grams of gelatin in 1000 cc. of water. This solution is applied to the rear side of a film or a plate. The colored backing layer is decolorized within a short time by means of the photographic baths.

Example 3.—A mixture of 15 grams of 3-oxy-thionaphthene, 12 grams of m-oxybenzaldehyde, 100 cc. of alcohol and 1 cc. of piperidine is heated on the water bath for about 1 to 2 hours. After cooling, the dye which separates is removed by filtration. The dye forms light yellow crystals and corresponds probably with the formula

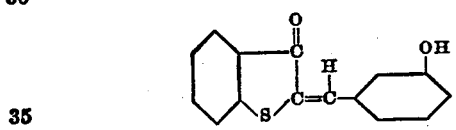

For the manufacture of filter layers the dye is incorporated in a colloid such as gelatin from its solution in aqueous ammoniacal alcohol.

Example 4.—A mixture of 15 grams of 3-oxy-thionaphthene, 31 grams of the sodium salt of benzaldehydedisulfonic acid, 100 cc. of water and 1 gram of sodium hydroxide are heated on the water bath for about 1 hour. Then the dye is precipitated from the yellowish brown solution by means of a solution of common salt. The dye forms yellow crystals and corresponds probably with the formula:

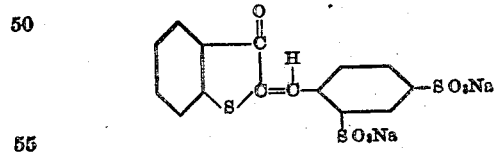

Filter layers are cast from a solution of 5 grams of the dye and 100 grams of gelatin in 1200 cc. of water.

Example 5.—19 grams of 3-oxyselenonaph-thene, 21 grams of the sodium salt of p-benzalde-hydesulfonic acid, 100 cc. of alcohol and 1 cc. of piperidine are heated for about 1 to 2 hours on the water bath. After cooling the dye which has precipitated is separated by filtration. There are obtained yellow crystals which correspond probably with the formula:

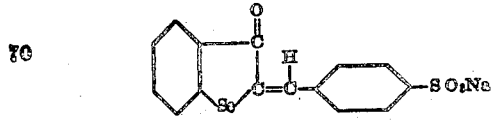

Filter layers may be cast from a solution of 4 grams of the dye, 100 grams of gelatin and 1250 cc. of water.

Example 6.—14.4 grams of thiobarbituric acid and 22.0 grams of 4-dimethylamidobenzaldehyde-2-sulfonic acid are dissolved in hot water and then heated to boiling temperature. From the reaction mixture a condensation product separates in form of red crystals. The reaction takes the following course:

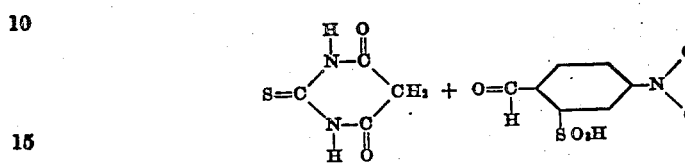

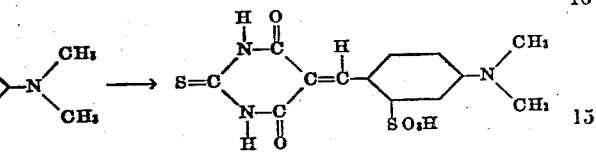

Filter layers may be cast from a solution of 2 to 10 grams of the dye, 10 grams of ammonium polyglucuronate and 1000 cc. of water.

My invention is not limited to the foregoing examples nor to the specific details given therein. Other starting materials may be used for producing other dyes and the dyes may be incorporated in other binding agents than those mentioned in the examples. In the specification and the claims the term filter layer and anti-halation is regarded as designating equivalents.

What I claim is:

1. Photographic filter layers comprising a binding agent and a dye decolorizable in the developing solutions and corresponding with the formula $$R_1=CH-R_2$$

wherein $R_2$ stands for an aromatic radical and $R_1$ stands for a cyclic compound containing in β-position to the =CH— group a keto group.

2. Photographic filter layers comprising a binding agent and a dye corresponding with the formula $$R_1=CH-R_2$$

wherein $R_1$ stands for malonyl urea, malonyl thiourea, oxythionaphthenes, oxyselenonaph-thenes, coumaranon, ketohydrindene, diketohy-drindene, and $R_2$ stands for the radicals of benzene, mono-alkoxybenzene, dialkoxybenzene, hydroxybenzene, furan, naphthalene, hydroxynaphthalene.

3. Photographic filter layers comprising ammonium polyglucuronate and the dye corresponding with the formula:

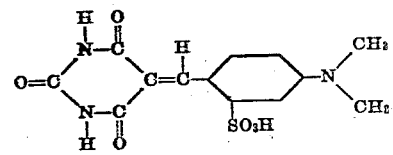

4. Photographic filter layers comprising gelatin and the dye corresponding with the formula:

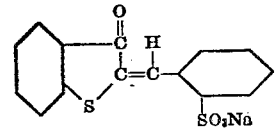

5. Photographic filter layers comprising gelatin and the dye corresponding with the formula:

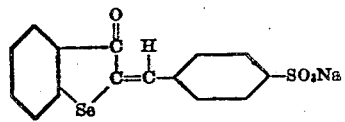

WILHELM SCHNEIDER.